Patented Apr. 26, 1938

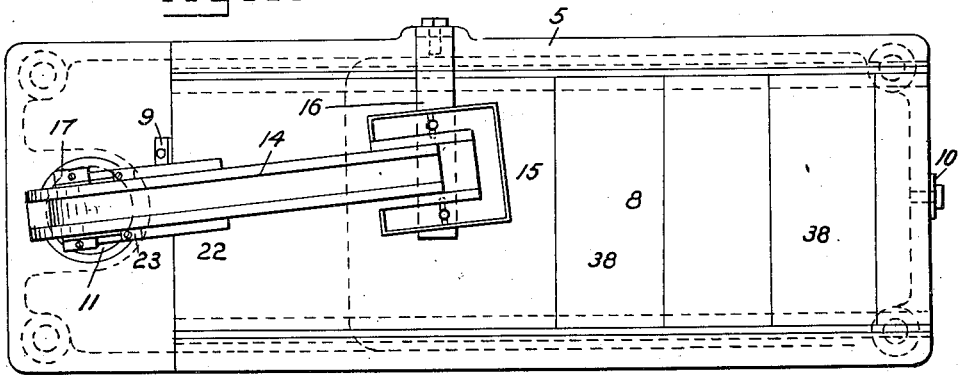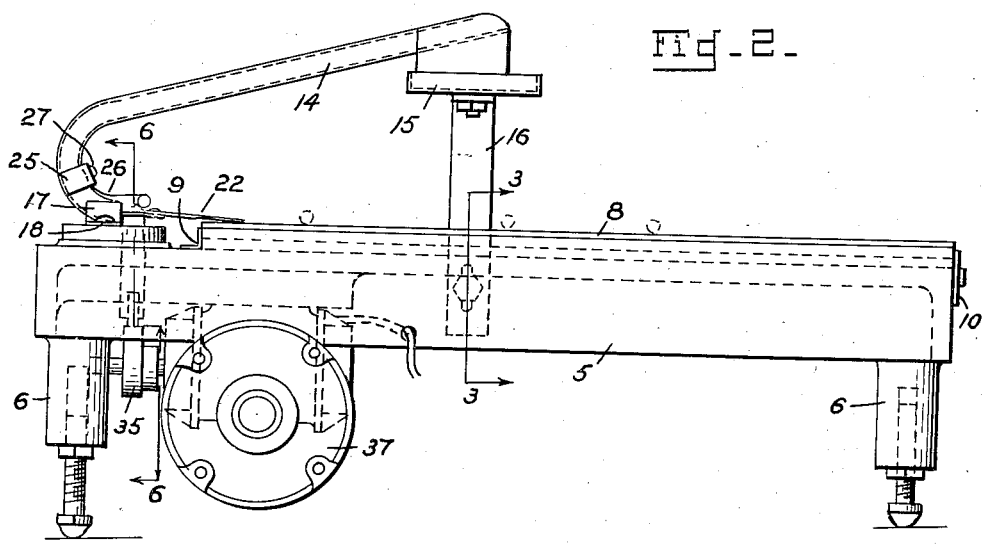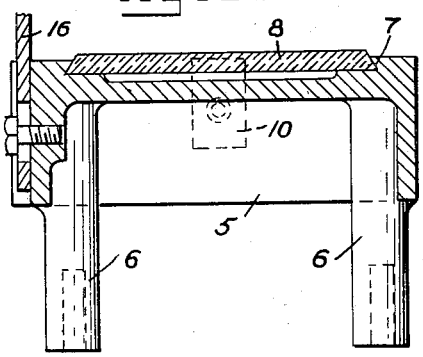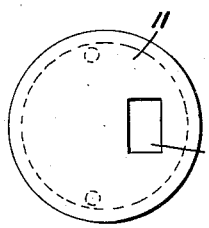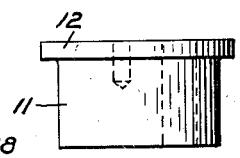

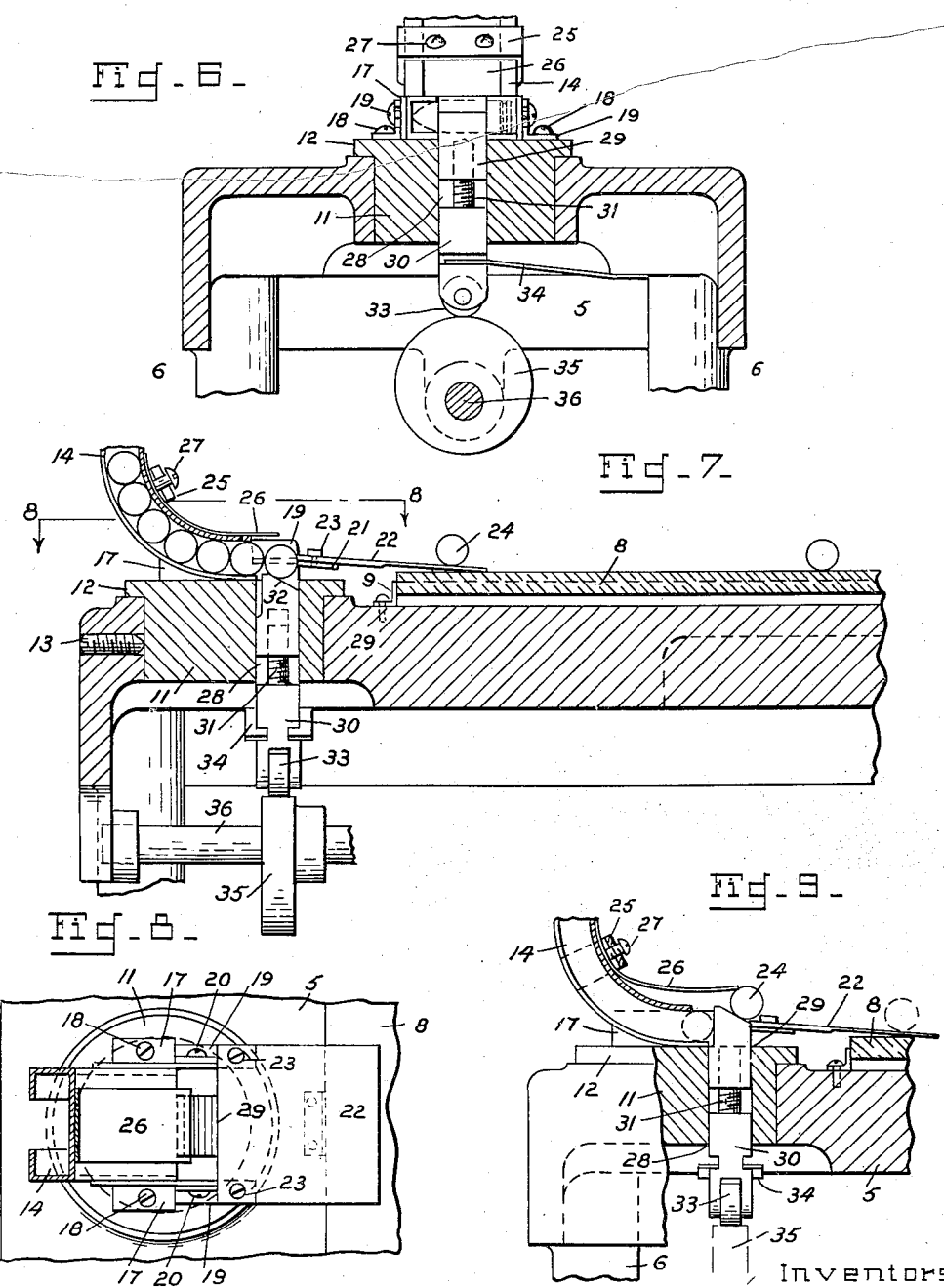

2,115,032

UNITED STATES PATENT OFFICE 2,115,032

APPARATUS FOR TESTING CARTRIDGES

George A. Miller, Jr., Weirsdale, Fla., and William Miller, Gerard D. Noble, and Edward R. Wills, Philadelphia, Pa.

Application March 22, 1937, Serial No. 132,357

2 Claims. (Cl. 73—51)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to an apparatus for testing cartridges to determine variations in the powder charge or components.

In loading cartridges the situation occurs where the powder charge is omitted or an incorrect amount of powder is supplied to the cartridge case by the loading machine. The weight tolerances allowed on the cartridge case and the bullet amount to about three times the weight of the powder charge so that it is impossible to check the presence of the powder or its exact amount by weighing the assembled round.

The purpose of this invention is to provide an apparatus whereby assembled cartridges are individually delivered at definite intervals onto an incline to roll over a plane surface. The friction of the powder on the interior of the case will provide a braking action to reduce the momentum of the rolling cartridge so that it will come to rest within definite limits if it is correctly loaded or outside of these limits if it is incorrectly loaded.

To these and other ends, the invention consists in the construction, arrangement and combination of elements described hereinafter and pointed out in the claims forming a part of this specification.

A practical embodiment of the invention is illustrated in the accompanying drawings, wherein:

Fig. 1 is a plan view of the apparatus forming the subject of this invention.

Fig. 2 is a view in side elevation.

Fig. 3 is a sectional view on the line 3—3 of Fig. 2.

Figs. 4 and 5 are respectively views in plan and side elevation of the bearing block.

Fig. 6 is a sectional view on the line 6—6 of Fig. 2.

Fig. 7 is a sectional view on the line 7—7 of Fig. 6.

Fig. 8 is a sectional view on the line 8—8 of Fig. 7.

Fig. 9 is a detail view showing a cartridge about to be moved onto the ramp.

Referring to the drawings by characters of reference there is shown a table 5 having adjustable legs 6 whereby it may be moved into and out of level position. The upper surface of the table is formed with a groove 7 for receiving a smooth-surfaced plate 8 preferably of glass, which is held in place at its ends by lugs 9 and 10 attached to the table.

One end of the table is formed with a vertically disposed opening for receiving a bearing block 11 (Fig. 7) having a flange 12 engaging the upper surface of the table and held against rotational displacement by a set screw 13. A feed trough 14 has the upper end of its inclined portion carried by a tray 15 attached to a bracket 16 and it has the lower end of its reversely bent portion provided with a stirrup 17 which is seated on the bearing block 11 and attached thereto by means of screws 18—18. A pair of similar brackets 19—19 attached by screws 20—20 to the sides of the stirrup are each provided with a suitably inclined projecting portion 21 and these portions support a ramp 22 which is secured thereto by screws 23—23. The ramp is arranged to have a slight inclination and its unsecured end rests on the plate 8. The cartridges 24 after leaving the feed trough roll down the ramp and across the plate 8.

A clip 25 embracing the feed trough and spaced from the exit is employed to retain a flat spring 26 which is inserted between the clip and the inner surface of the reversely bent portion of the trough. The spring is held in position of adjustment by means of screws 27 threaded in the clip and its lower end projects beyond the exit of the trough.

The bearing block 11 is formed with a vertically disposed opening 28 for receiving a lifting finger consisting of an upper part 29 and a lower part 30, adjustably connected by a threaded stud 31 fixed to one of the parts, which in the present example is the lower part.

The upper part is formed with an inclined cartridge engaging surface 32 having its high point on the side towards the exit of the feed trough and its low point on the side towards the ramp. The lower part of the finger carries a roller 33 and is engaged by a leaf spring 34 secured to the table. The spring normally tends to lower the lifting finger and maintain the roller in contact with a cam wheel 35.

The cam wheel 35 is mounted on a shaft 36 which may be manually rotated but is preferably driven by an electric motor 37 which has a self contained gear reduction to provide rotation to the cam wheel at a rate of about 24 revolutions per minute.

When cartridges are inserted in the feed trough they will move by gravity out of the exit, the first cartridge being brought to rest when it engages the ramp 22, in which position it is disposed between the brackets 19 and straddles the opening 28 above the lifting finger 29—30. The lifting finger on its upward stroke, elevates the end cartridge over the edge of the ramp and causes the spring 26 to be deflected by the cartridge, and assume a position opposite to the inclined surface 32 of the lifting finger. As a result the cartridge is pressed from one side and delivered onto the ramp down which it rolls onto the plate 8.

Normal or correctly assembled cartridges will roll a certain distance on the plate 8 and come to rest. Abnormal cartridges having an insufficient or excessive powder charge or no powder charge will roll to a greater distance and the length of the plate 8 is so determined that these cartridges will roll off the end. A cartridge in which the slug is missing from the jacket of the bullet will not roll as far as a normal cartridge because of lighter mass and less momentum. Cartridges intentionally assembled with known defects are used to calibrate the apparatus and are run through at frequent intervals. The plate 8 may be inscribed with spaced lines 38—38 which define the limits within which a normal cartridge will come to rest.

In operation, an operator employs one hand to feed the cartridge into the trough and the other hand to remove tested cartridges and place them in a container.

We claim:

1. Cartridge testing apparatus comprising a support, a rolling plate on the support, a bearing block in the support and having a vertically disposed opening, a cartridge feed trough attached to the bearing block and having an exit alongside the opening in said block, a ramp attached to the trough and having one edge above the block and the opposite edge resting on the rolling plate, a flat spring carried by the trough and extending above the opening in the bearing block, and a lifting finger reciprocally mounted in the opening of the block.

2. Cartridge testing apparatus comprising a support having a plane surface, a cartridge feed trough mounted on the support adjacent the plane surface and having an exit, a ramp arranged to arrest a cartridge as it leaves the exit, a flat spring carried by the trough and extending beyond the exit normally parallel to the direction of issuance of a cartridge from the exit, and a lifting finger reciprocally mounted in the support adjacent the exit of the trough and adapted to lift the cartridge leaving the trough over the edge of the ramp and against the spring.

GEORGE A. MILLER, Jr.
WILLIAM MILLER.
GERARD D. NOBLE.
EDWARD R. WILLS.